United States Patent Office

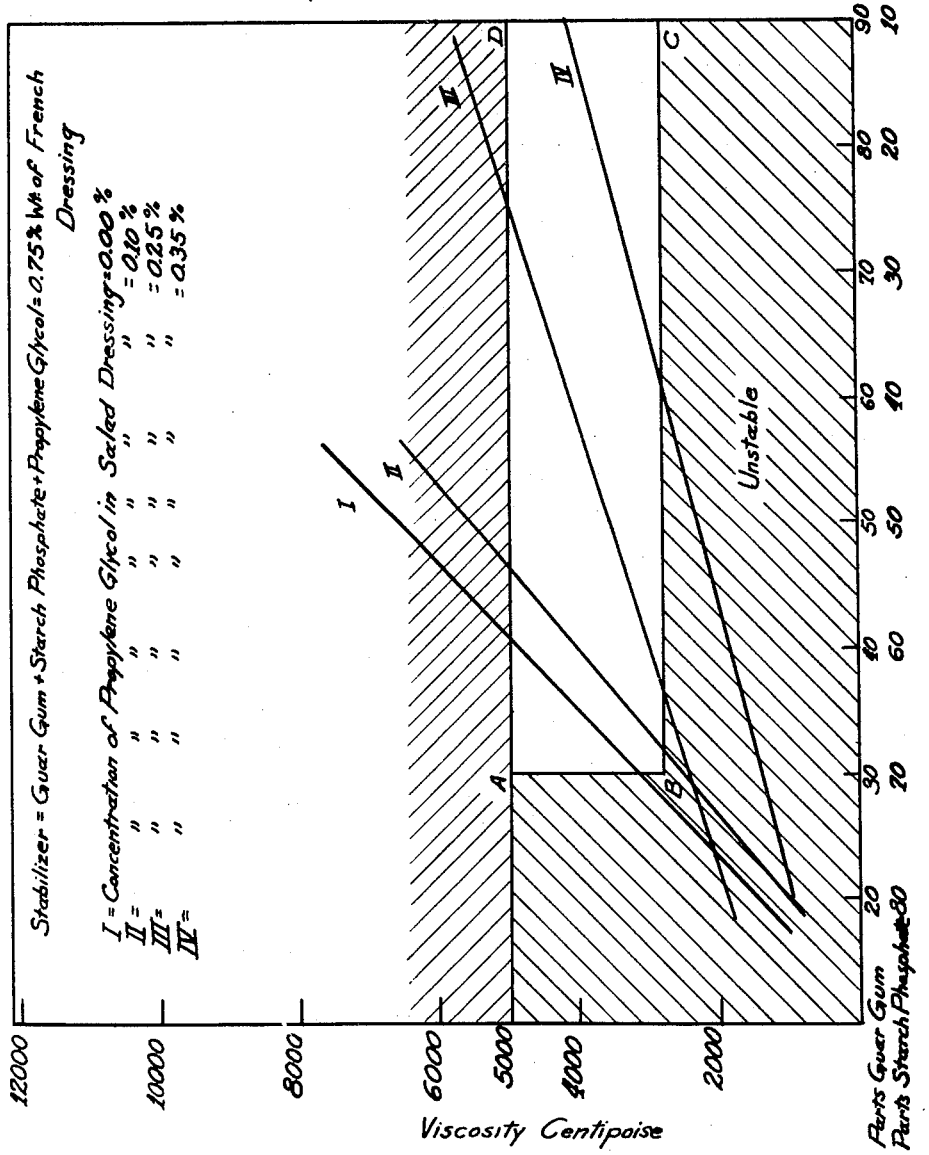

3,108,004
Patented Oct. 22, 1963

3,108,004
STABILIZING COMPOSITION FOR OIL-IN-WATER EMULSIONS
Robert H. Klostermann, Wheaton, Ill., assignor to Vita-Zyme Laboratories, Incorporated, Chicago, Ill., a corporation of Illinois
Filed May 19, 1961, Ser. No. 111,340
6 Claims. (Cl. 99—144)

This invention relates to a composition adapted for stabilizing emulsions of the oil-in-water type and particularly oil-in-water emulsions of the type employed in food products such as salad dressings and the like.

A very serious problem in connection with the distribution and use of food products such as salad dressings and other food products which in essence are acidic oil-in-water emulsions is the tendency of the product to separate into water and oil phases. In certain salad dressings, such as the Italian salad dressing type, separation of the phases is not detrimental or undesirable. This type of salad dressing is classified in the art as a "separating type dressing." However, other salad dressings such as those of the French dressing type are classified as "non-separating type dressings," and in this type of dressing it is desired to prevent phase separation so that the food product can be stored for extended periods of time. Thus it is ordinarily necessary to employ a stabilizing agent in these non-separating type dressings to prevent separation of the water and oil phases. Stabilization of these non-separating type salad dressings is complicated by the fact the product must have such a consistency or viscosity that permits it to flow freely from the bottle in which it is distributed. Thus, a suitable stabilizing agent must function to effectively stabilize the food product without causing an appreciable increase in the viscosity thereof.

An object of the present invention is the provision of a novel composition particularly adapted for stabilizing or preventing separation of oil-in-water emulsions.

Another object of the present invention is the provision of a composition suitable for use in food products consisting of oil-in-water emulsions to effectively stabilize the food products and to permit storage thereof for extended periods of time without appreciable phase separation.

Another object of the invention is the provision of a novel composition suitable for use as a stabilizing agent in food products consisting of oil-in-water emulsions, the said stabilizing composition comprising a novel combination of edible ingredients, the proportions of which can be varied to achieve a controlled separation between the phases of the food product.

A further object of the invention is the preparation of food products consisting of oil-in-water emulsions which exhibit improved stability and viscosity characteristics which facilitate use of the product.

It is a more specific object of the invention to provide improved salad dressings of the non-separating or French type which may be stored for extended periods of time without appreciable separation of the ingredients thereof and which have relatively low viscosities whereby the dressings are free-flowing and can be readily poured from bottles or other similar containers.

These and other objects of the invention will be apparent from the following description and claims.

It has been found in accordance with the present invention that a composition comprising guar gum and starch phosphate in suitable weight proportions has particular advantage for use in food products consisting of oil-in-water emulsions to prevent separation of the various phases. A preferred stabilizing composition of the invention also includes propylene glycol in suitable proportions.

The starch phosphate employed in the stabilizing compositions of the present invention are the phosphate-modified starches described in U.S. Patents 2,865,762, 2,824,-870 and 2,884,412, which were issued to Hans Neukom. These phosphate-modified starches (which for convenience are referred to herein simply as "starch phosphates") are cold-water swelling alkali metal starch phosphates which are prepared by heating ungelatinized starch with an alkali metal phosphate. The phosphate is introduced into the starch granule by soaking the starch in an aqueous solution of the alkali metal phosphate, such as an aqueous solution containing an orthophosphate salt of an alkali metal. The pH of the solution should preferably be between about 4 and 7. The resulting soaked starch granule is then separated from the solution, excess surface moisture is removed and the resulting material is heated at a temperature between about 120° C. and 175° C. for from one to several hours. The heating is carried out either at atmospheric pressure or under vacuum and is preferably carried out between about 140° C. and about 170° C. These starch phosphates are commercially available from American Maize Products Company, Roby, Indiana.

The guar gum component of the composition is a natural gum material available from domestic sources. A hydrophilic colloidal guar gum is commercially available from General Mills Inc., Minneapolis, Minn.

The proportions in which the components of the stabilizing composition are employed vary depending upon the intended application of the stabilizing composition. In general, the stabilizing composition of the invention comprises a starch phosphate in a proportion from about 10 to 90 parts by weight, and guar gum in a proportion from about 10 to 90 parts by weight. In the preferred stabilizing compositions of the invention, propylene glycol is employed in a proportion from about 1 to 45 parts by weight.

The unique advantages of the stabilizing compositions of the present invention are further illustrated in connection with their use as stabilizing agents in salad dressings of the non-separating French dressing type.

The preparation of satisfactory salad dressings of this type is particularly difficult due to the fact that not only must the product exhibit satisfactory stability for extended periods of time but its viscosity or consistency must be maintained at a relatively low value. Generally, specifications set on French salad dressings set the maximum permissible viscosity at about 5000 centipoises. Furthermore, the amount of stabilizing agent or emulsifying agent employed in French salad dressing must not exceed 0.75% of the total weight of the composition in order to comply with regulations of the Food and Drug Administration.

A further problem encountered in connection with French salad dressings involves the phenomenon of thixotropy, wherein the salad dressing upon standing quiescent sets up or forms a gel-like consistency making it difficult to pour the dressing from its container. The thixotropic gel can be liquefied by strong agitation so that it is frequently necessary to shake the bottle of French dressing vigorously before using. This is bothersome to the consumer and undesirable from a sales standpoint.

The following description relates to the use of preferred stabilizing compositions of the invention in salad dressings of the French dressing type. (The maximum permissible viscosity of the French dressings has been set at 5000 centipoises and the stability must be such that no appreciable separation occurs for a period of time equivalent to about 4 days at temperature of about 50° C.)

A French type salad dressing was prepared having the following basic formulation:

| Ingredient: | Wt. percent |
|---|---|
| Water | 19.31 |
| Vinegar-cider, 50 grains (5% acid) | 21.24 |
| Vegetable oil | 40.00 |
| Stabilizer | 00.75 |
| Sucrose | 12.00 |
| Salt | 4.00 |
| Mustard | 1.20 |
| Paprika | 1.50 |
| | 100.00 |

In preparing the above dressing the dry solids were premixed and added to the oil and thoroughly wetted. The aqueous phase was then added accompanied by vigorous high-speed shear type agitation for about 5 minutes and the mixture was then homogenized.

Using the above formulation a number of salad dressings were prepared wherein the proportion of stabilizer ingredients varied as shown in Table I. The starch phosphate ingredient of the stabilizing composition was a standard grade starch phosphate supplied by American Maize Products Company, Roby, Indiana, and designated Starch Phosphate, Standard Grade ARD-1230. The guar gum employed is a commercially available item of commerce sold by General Mills, Inc. under the trade name "Galactosol."

Table I

| Sample | Wt. Guar Gum | Wt. Starch Phosphate | Wt. Propylene Glycol | Ratio Guar Gum to Starch Phosphate |
|---|---|---|---|---|
| I | 0.70 | 6.30 | 0.50 | 10:90 |
| I-A | 0.70 | 6.30 | | 10:90 |
| II | 1.05 | 5.95 | 0.50 | 15:85 |
| II-A | 1.05 | 5.95 | | 15:85 |
| III | 1.40 | 5.60 | 0.50 | 20:80 |
| III-A | 1.40 | 5.60 | | 20:80 |
| IV | 1.75 | 5.25 | 0.50 | 25:75 |
| IV-A | 1.75 | 5.25 | | 25:75 |
| V | 2.10 | 4.90 | 0.50 | 30:70 |
| V-A | 2.10 | 4.90 | | 30:70 |
| VI | 2.45 | 4.55 | 0.50 | 35:65 |
| VI-A | 2.45 | 4.55 | | 35:65 |
| VII | 2.80 | 4.20 | 0.50 | 40:60 |
| VII-A | 2.80 | 4.20 | | 40:60 |
| VIII | 3.15 | 3.85 | 0.50 | 45:55 |
| VIII-A | 3.15 | 3.85 | | 45:55 |
| IX | 3.50 | 3.50 | 0.50 | 50:50 |
| IX-A | 3.50 | 3.50 | | 50:50 |

The stability of the above French salad dressing samples were determined by measuring the separation which occurred over a period of time at room temperature and at 50° C. To do this, the salad dressing samples were placed in graduated cylinders so that the height of the separated phase could be accurately measured. The results of these stability tests are shown below.

Table II

| Sample | Days Lapsed | Separation (millimeters) | |
|---|---|---|---|
| | | Room Temperature, 68° F. | 122° F. (50° C.) |
| I | 11 | 20 | 21 |
| I-A | 11 | 20 | 21 |
| II | 11 | 13 | 16 |
| II-A | 11 | 13 | 13 |
| III | 11 | 3 | 9 |
| III-A | 11 | 0 | 4 |
| IV | 10 | 3 | 5 |
| IV-A | 10 | 3 | 5 |
| V | 10 | 1 | 3 |
| V-A | 10 | 3 | 4 |
| VI | 10 | 0 | 0 |
| VI-A | 10 | 0 | 0 |
| VII | 10 | 0 | 0 |
| VII-A | 10 | 0 | 0 |
| VIII | 10 | 0 | 0 |

Utilizing essentially the same basic French dressing formulation as shown above a number of salad dressings were prepared and tested employing various proportions of guar gum, starch phosphate and propylene glycol in the stabilizing composition. A plot of this data is shown in the accompanying drawing. Specifications were that the viscosity of the salad dressing could not exceed 5000 centipoises as measured on a Brookfield Synchro-Electric Viscometer, model RVF; spindle #3 at 20 revolutions per minute and the degree of separation between phases could not exceed 1/16 inch after 4 days at 122° F. (50° C.) or 45 days at 68° F. The French salad dressing contained from 2–4 weight percent of salt. It was found that the salad dressings exhibited satisfactory stability and viscosity characteristics when the guar gum, starch phosphate and propylene glycol were employed in such weight proportions so the composition of the stabilizer lies approximately within the 4-sided figure of the accompanying drawing, identified by the fact that its area lies within the straight lines connecting A, B, C, D. Thus, for example, referring specifically to the drawing a particularly preferred stabilizing composition is one employing propylene glycol in an amount equivalent to 0.25% by weight of the salad dressing with the remainder of the stabilizing composition being composed of guar gum and starch phosphate in a ratio from about 35:65 to about 65:35. Based on the weight of the salad dressing the propylene glycol component of this preferred stabilizing composition would be equivalent to 0.25% by weight and the guar gum and starch phosphate components of the stabilizing composition would be present in the salad dressing in amounts ranging from 0.175% to 0.325% by weight.

Moreover, tests showed that salad dressings employing the preferred stabilizing compositions were not thixotropic in nature, that is they did not tend to gel upon standing quiescent but rather retained desirable free-flowing characteristics. When the guar gum, starch phosphate and propylene glycol were employed in such proportions that the composition of the stabilizer lay outside the area bounded by the straight lines A, B, C, D the stability of the salad dressings was unsatisfactory or the viscosity of the salad dressing was too high.

As will be noted from the drawing the use of small amounts of propylene glycol in the stabilizing composition lowers the viscosity of the salad dressing and permits greater variation in the proportions of the starch phosphate and guar gum. Moreover, it appears that the propylene glycol contributes significantly to elimination of any thixotropic effect in the salad dressings.

It is to be understood that the data presented in the drawing illustrates preferred stabilizing compositions for use in non-separating salad dressings of the French type wherein it is desired to maintain the viscosity of the dressings at less than 5000 centipoises and wherein the proportion of the stabilizing composition cannot exceed 0.75% by weight of the salad dressing. From the data presented herein, one skilled in the art can readily determine the suitable proportions of guar gum, starch phosphate and propylene glycol to employ in formulating a stabilizing composition for any particular application. For example, if it is desired to have a salad dressing of higher viscosity, this can be readily achieved by employing the guar gum and starch phosphate in such proportions that the composition of the stabilizer falls outside of the area in the accompanying drawing bounded by straight lines A, B, C and D. Likewise, if it is desired to obtain a salad dressing in which separation is permissible at a relatively controlled rate the proportion of the components of the stabilizing composition can be selected to obtain this result.

While the novel stabilizing compositions of the invention have been illustrated specifically with respect to use in French type salad dressings their utility is not limited to this application. The stabilizing compositions encompassed by the present invention have utility as stabilizing agents for oil-in-water emulsions in general, and are particularly adapted for stabilizing food products which consist essentially of oil-in-water emulsions. Thus, the stabilizing compositions of the invention can be employed in salad dressings of various types, frozen products, meat sauces, soups, pie fillings, relishes, pharmaceutical emulsions and the like.

Specific advantages afforded by the stabilizing compositions of this invention are: (1) separation of phases in "non-separating" type of salad dressings can be significantly reduced by inclusion of the stabilizing composition, (2) controlled separation of phases can be obtained in "separating" type salad dressings by inclusion of the stabilizing composition of the invention in proper proportions, (3) the stabilizing composition can be readily dispersed in either the oil phase or the water phase of oil-in-water emulsions, (4) salt (sodium chloride) has no adverse effect on the performance of the stabilizing compositions of the invention.

Those modifications and equivalents which fall within the spirit of the invention and the scope of the appended claims are to be considered part of the invention.

I claim:

1. A composition adapted for stabilizing oil-in-water emulsions comprising a phosphate-modified starch in a proportion between about 10 and 90 parts by weight and guar gum in a proportion between about 10 and 90 parts by weight.

2. A composition adapted for stabilizing oil-in-water emulsions comprising a phosphate-modified starch in a proportion between about 10 and 90 parts by weight, guar gum in a proportion between about 10 and 90 parts by weight and propylene glycol in a proportion between about 1 and 45 parts by weight.

3. A free-flowing stable salad dressing comprising a salad dressing having incorporated therein a stabilizing agent comprising a phosphate-modified starch in a proportion between about 10 and 90 parts by weight, guar gum in a proportion of between about 10 and 90 parts by weight and propylene glycol in a proportion between about 1 and 45 parts by weight.

4. A free-flowing stable salad dressing having a viscosity not greater than about 5000 centipoises and a stability such that separation between phases does not exceed about 1/16 inch over a period of 4 days at a temperature of 122° F. comprising a salad dressing base having incorporated therein a stabilizing agent comprising a phosphate-modified starch, guar gum and propylene glycol in such weight proportions that the composition of the stabilizer lies approximately within the 4-sided figure of the accompanying drawing and which 4-sided figure is identified by the fact that its area lies within the straight lines connecting A, B, C and D.

5. A free-flowing stable salad dressing having a viscosity not greater than about 5000 centipoises and a stability such that separation between phases does not exceed about 1/16 inch over a period of 4 days at a temperature of 122° F. comprising a salad dressing base having incorporated therein a stabilizing agent comprising a phosphate-modified starch ranging from 0.175 to 0.325 part by weight of the salad dressing, guar gum in an amount equivalent to about 0.175 to 0.325 part by weight of the salad dressing and propylene glycol in an amount equivalent to 0.25% by weight of the salad dressing.

6. A free-flowing stable salad dressing having a viscosity not greater than about 5000 centipoises and a stability such that separation between phases does not exceed about 1/16 inch over a period of 4 days at a temperature of 122° F. comprising a salad dressing base having incorporated therein a stabilizing agent comprising a phosphate-modified starch in an amount equivalent to about 0.25% by weight of the salad dressing, guar gum in an amount equivalent to about 0.25% by weight of the salad dressing and propylene glycol in an amount equivalent to about 0.25% by weight of the salad dressing.

References Cited in the file of this patent

UNITED STATES PATENTS

| | | |
|---|---|---|
| 2,313,033 | Joffe | Mar. 2, 1943 |
| 2,377,610 | Brown | June 5, 1945 |
| 2,502,397 | Werbin | Mar. 28, 1950 |
| 2,884,412 | Neukom | Apr. 28, 1959 |